United States Patent
Wu et al.

(10) Patent No.: US 7,832,276 B2
(45) Date of Patent: Nov. 16, 2010

(54) PRESSURE MEASURING DEVICE AND METHOD

(75) Inventors: Xu Wu, Paris (FR); Arthur Hartog, Winchester (GB); Dimitri Cadere, St. Cyr l'Ecole (FR); Tsutomu Yamate, Yokohama Kanagawa (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 73 days.

(21) Appl. No.: 12/334,584

(22) Filed: Dec. 15, 2008

(65) Prior Publication Data
US 2009/0151423 A1 Jun. 18, 2009

(30) Foreign Application Priority Data
Dec. 18, 2007 (EP) ................... 07301701

(51) Int. Cl.
*G01F 9/00* (2006.01)
(52) U.S. Cl. ..................................... 73/705
(58) Field of Classification Search ............. 73/705, 73/700, 725; 356/454, 480, 519
See application file for complete search history.

(56) References Cited
U.S. PATENT DOCUMENTS

| | | | | |
|---|---|---|---|---|
| 4,815,828 A | * | 3/1989 | Rushford | 349/20 |
| 5,385,053 A | * | 1/1995 | Wlodarczyk et al. | 73/705 |
| 5,870,511 A | * | 2/1999 | Sawatari et al. | 385/12 |
| 6,422,084 B1 | * | 7/2002 | Fernald et al. | 73/705 |
| 7,134,346 B2 | * | 11/2006 | Lopushansky et al. | 73/716 |
| 2002/0003917 A1 | | 10/2002 | Sherrer et al. | |
| 2007/0223000 A1 | * | 9/2007 | Gahan et al. | 356/454 |

FOREIGN PATENT DOCUMENTS

| | | |
|---|---|---|
| CA | 2599696 | 8/2009 |
| EP | 0266974 | 11/1988 |
| EP | 0373010 | 6/1990 |
| EP | 1008840 | 6/2000 |
| WO | WO2005098385 | 10/2005 |

* cited by examiner

*Primary Examiner*—Jewel Thompson
(74) *Attorney, Agent, or Firm*—Dave R. Hofman (57) ABSTRACT

A device to measure a fluid pressure comprises a pressure sensing element 10 and a pressure readout element 20. The pressure sensing element 10 comprises a cavity 11 capped by a flexible membrane 13, the cavity having a length d that varies with the fluid pressure $P_1$ applied on the flexible membrane 13. The pressure readout element 20 comprises a light source 24 for providing an incident beam of a determined wavelength range directed towards the cavity and an optical spectral analyzer 25 for measuring a power spectrum of a return beam reflected by the cavity, and processing means 27 for determining the cavity length d and the fluid pressure $P_1$ based on the power spectrum.

19 Claims, 5 Drawing Sheets

PRESSURE MEASURING DEVICE AND METHOD

FIELD OF THE INVENTION

The invention relates to a device and a method used for measuring pressure of fluids flowing in a borehole penetrating geological formations, or fluids present in the geological formations. The invention finds a particular application in the oilfield industry.

BACKGROUND OF THE INVENTION

Pressure sensors have wide applications in oilfield industry. Generally, pressure sensing elements are delicate transducers that are interrogated electrically. Pressure gauges, especially those for oilfield industry in harsh environments application, easily corrode or erode if exposed to downhole fluids without protection. Thus, they commonly require the protection of a working fluid such as silicon oil. The working fluid are commonly contains in bellows that introduce hysteresis.

Document U.S. Pat. No. 5,024,098 describes a pressure sensor useable in oil wells. The pressure sensor comprises a cell carrying a strain-measuring circuit. The cell is placed inside a body and is put into contact with the pressure to be measured. The cell has a hermetically sealed internal chamber inside which pressure is set to a low value. The outside surface of the cell is subjected to the pressure to be measured. The cell is constituted by two half-shells joining together according to a join plane. The cell is preferably made of sapphire, with the crystal axis of the sapphire being perpendicular to the join plane so as to obtain isotropic stresses. The strain-measuring circuit is deposited on a plane surface of one of the half-shells, parallel to the join plane. The strain-measuring circuit needs to be coupled to electrical means of interrogation. However, electrical means of interrogation is inappropriate in certain circumstances, for instance due to temperature constraints or unavailability of electrical power.

Further, when differential pressure measurements are required, many differential pressure gauges employ two absolute gauges to make independent measurements. Differential pressure is then calculated mathematically. A good accuracy is obtained when the differential pressure measurement represents a large fraction of the absolute pressures. However, in case of small differential pressure, the error associated with the differential pressure measurement rises significantly.

SUMMARY OF THE INVENTION

It is an object of the invention to propose a device and a method for measuring pressure of fluids flowing in a borehole penetrating geological formations, or fluids present in the geological formations that overcome at least one of the drawbacks of the prior art measuring devices and methods.

According to an aspect, the invention relates to a device to measure a fluid pressure comprising a pressure sensing element and a pressure readout element. The pressure sensing element comprises a cavity capped by a flexible membrane, the cavity having a length that varies with the fluid pressure applied on the flexible membrane. The pressure readout element comprises a light source for providing an incident beam of a determined wavelength range directed towards the cavity and an optical spectral analyzer for measuring a power spectrum of a return beam reflected by the cavity, and processing means for determining the cavity length and the fluid pressure based on the power spectrum.

The cavity may form a Fabry-Perot interferometer.

The pressure sensing element may further comprises a membrane supporting wall and a reference window, the membrane supporting wall supporting the flexible membrane and being supported by a base.

The inner part of the flexible membrane and the membrane supporting wall may have a dome shape.

The base comprises a hole closed by the reference window which defines the bottom of the cavity.

The pressure readout element further comprises a fiber optic collimator accommodated in the hole behind the reference window, the fiber optic collimator being coupled to the light source and the optical spectral analyzer through an optical fiber and an optical coupler, the optical spectral analyzer being coupled to the processing means.

A first surface between the reference window and the cavity, a second surface between the cavity and the membrane, and a reference surface between the collimator and the reference window are ground and polished, the first and second surfaces being reflecting surfaces.

The first surface may be metal-coated up to 50% reflectivity.

The second surface may be metal-coated such as to be a full reflective mirror surface.

The reference surface may be left untreated or receives an antireflection coating.

A fiber Bragg grating inserted into the optic fiber near the collimator may be used as a temperature sensor.

The reference window defining the reference surface and the first surface may be used as a temperature sensor, the reference surface $S_0$ being left untreated.

A notch filter adhered to the reference surface of the reference window may be used as a temperature sensor.

At least the membrane supporting wall and the flexible membrane of the pressure sensing element are made of a material chosen among the group of material comprising sapphire, quartz and zirconium.

The membrane supporting wall, the flexible membrane, the base and the reference window may be made of sapphire and bonded together by a sapphire bonding such as to form, once assembled, a monolithic piece of sapphire.

The cavity is a vacuum cavity.

The pressure measuring device may have the additional characteristics:
  the membrane is a flat membrane,
  the membrane supporting wall comprises holes communicating with a circumferential recess,
  the circumferential recess being positioned around the membrane supporting wall and communicating with bellows,
  the circumferential recess, the cavity and the bellows being bathed in a working fluid,
  a first and second O-ring being positioned above and below the circumferential recess, respectively,
  the top side of the membrane being exposed to a first fluid pressure, the bellows being exposed to the second fluid pressure, the cavity length varying with the first fluid pressure applied on the flat membrane and the second fluid pressure applied on the bellows such as to form a differential pressure measuring device.

The pressure sensing element is contained in a packaging structure that may comprise:
  a packaging cap coupled to a packaging base, the packaging cap being subjectable to a high pressure, the packaging base being subjectable to a low pressure,
  a plurality of O-ring for pressure isolation between the packaging base and the packaging cap, the packaging cap further having an orifice for equalizing the pressure with the fluid pressure to be measured, the bottom of the base comprising a hole for letting pass the optical fiber.

The circumferential recess may be formed in the packaging cap and the bellows may be protected by a housing mounted on the packaging cap.

The optical fiber may be protected by a strain-relieving boot.

According to a further aspect, the invention relates to a fluid pressure measuring method, comprising the steps of:

submitting to a first fluid pressure a cavity capped by a flexible membrane, the cavity having a length that varies with the fluid pressure applied on the flexible membrane, providing an incident beam of a determined wavelength range directed towards the cavity, measuring a power spectrum of a return beam reflected by the cavity, and determining measurements of the cavity length and the fluid pressure based on the power spectrum.

The method may further comprise the steps of:

submitting the cavity filled with a working fluid to a second fluid pressure, and determining measurements of the cavity length and a differential fluid pressure based on the power spectrum.

The correspondence between the cavity length and the fluid pressure may be determined by calibration.

The method may further comprise the steps of:

measuring the temperature of the cavity, and correcting the measurements of cavity length based on the temperature.

Thus, the invention enables pressure measurements under the specifications of oilfield industry application. The superior property of sapphire and the simplicity of the structure allow a compact size, low hysteresis and high stability and bellow-free package. Its high-temperature and high-pressure ranges are particularly suited for harsh environments. The optical interrogation does not require electrical component downhole. The invention can be implemented as an absolute gauge or a differential gauge. The sapphire face presented to the well fluid is able to withstand hard chemical aggression. Thus, the device of the invention is particularly suitable for hot- and deep-well applications.

These and other aspects of the invention will be apparent from and elucidated with reference to the embodiments described hereinafter.

BRIEF DESCRIPTION OF THE DRAWINGS

The present invention is illustrated by way of example and not limited to the accompanying figures, in which like references indicate similar elements.

DETAILED DESCRIPTION OF THE INVENTION

Figure 1:
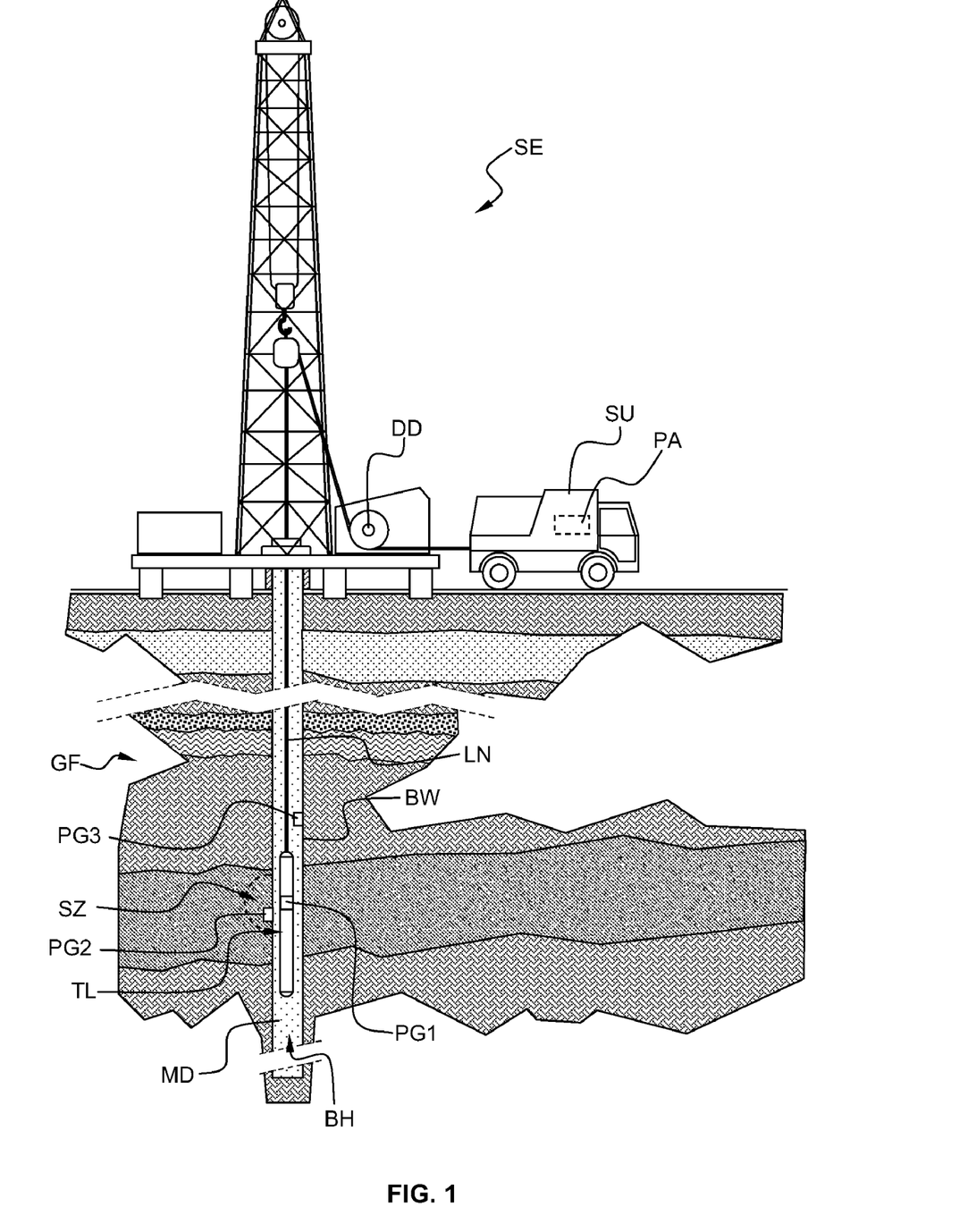
FIG. 1 schematically shows a typical onshore hydrocarbon well location illustrating a particular application of the device for measuring pressure of the invention.

FIG. 1 schematically shows a typical onshore hydrocarbon well location and surface equipments SE above hydrocarbon geological formations GF after drilling operations have been carried out. At this stage, i.e. before a casing string is run and before cementing operations are carried out, the wellbore is a borehole BH filled with a fluid mixture MD. The fluid mixture MD is typically a mixture of drilling fluid and drilling mud. In this example, the surface equipments SE comprise an oil rig and a surface unit SU for deploying a logging tool TL in the well-bore. The surface unit may be a vehicle coupled to the logging tool by a line LN. Further, the surface unit comprises an appropriate device DD for determining the depth position of the logging tool relatively to the surface level. The logging tool TL comprises a pressure measuring device PG1 that measures pressure of the fluid contained within the geological formation GF or flowing into the borehole BH. The logging tool may comprise various other sensors and may provide various measurement data related to the hydrocarbon geological formation GF and/or the fluid mixture DM (e.g. conductivity, resistivity, etc. . . . ). These measurement data are collected by the logging tool TL and may be transmitted to the surface unit SU by any known technique, or otherwise stored in the logging tool memory for subsequent processing when the memory is returned to the surface. The surface unit SU comprises appropriate electronic and software arrangements PA for processing, analyzing and storing the measurement data provided by the logging tool TL. Once the logging tool TL is positioned at a desired depth, characteristic parameter of a selected zone SZ of the formation, or of the fluid in the vicinity of the logging tool can be measured. Such a measurement can be repeated for other azimuth and other depth. Alternatively, in order to permanently monitor the pressure of fluids present downhole, the pressure measuring device PG2 may be positioned within the geological formation GF, for example in the selected zone SZ of the formation. As another alternative, the pressure measuring device PG3 may be positioned on the borehole wall.

Though not shown, those versed in the art know that the logging apparatus of FIG. 1 can also be adapted into a logging-while-drilling tool by mounting the logging tool TL on a drill collar. More precisely, a typical logging-while-drilling tool is incorporated into a bottom-hole assembly attached to the end of a drill string with a drill bit attached at the extreme end thereof. Measurements can be made either when the drill string is stationary or rotating. The measurement data that are collected by the logging tool may be transmitted by means of the known mud pulse technique to the surface unit coupled to a mud pulse receiver.

Furthermore, the pressure measuring device may also be positioned in a cased well (not shown).

Figure 2:
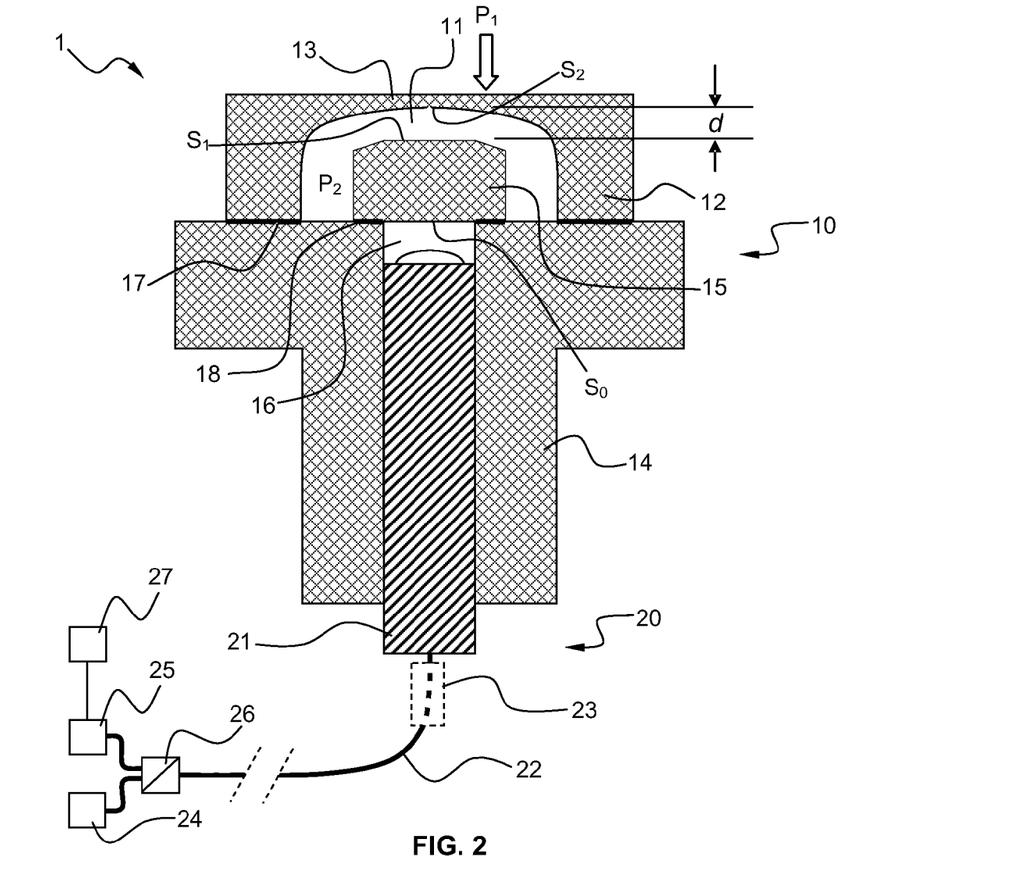
FIG. 2 is a cross-section view schematically illustrating the device for measuring pressure of the invention according to a first embodiment.

FIG. 2 is a cross-section view schematically illustrating the pressure measuring device of the invention according to a first embodiment. The first embodiment corresponds to a device measuring absolute pressure. The pressure measuring device 1 comprises a pressure sensing element 10 and a pressure readout element 20.

The pressure sensing element 10 comprises a Fabry-Perot interferometer. It comprises a cavity 11, a membrane supporting wall 12, a membrane 13, a base 14 and a reference window 15.

In the present example, the pressure sensing element 10 has a cylindrical symmetry geometry.

The cavity is a low pressure cavity, for example a vacuum cavity. The size of the cavity is defined by the membrane supporting wall 12, the membrane 13, the base 14 and the reference window 15.

The membrane supporting wall 12 supports the membrane 13. Advantageously, the membrane supporting wall and the membrane form together a unitary structure. The inner part of the structure has a dome shape in order to better withstand high pressure. Both sides of the membrane are polished to mirror quality in order to avoid concentration of stress. The membrane 13 has a thickness such as to form a flexible membrane which defines the top of the cavity 11. The membrane supporting wall and the membrane determine the pressure response of the sensor.

The membrane supporting wall 12 is supported by the base 14. More precisely, the membrane supporting wall bonds to the base. The base comprises a hole 16 for accommodating a part of the pressure readout element (the collimator as explained hereinafter), and in particular letting pass the light of the pressure readout element 20 towards the cavity 11. The hole 16 is closed by the reference window 15. The base can take any shape and size so long as it serves the above mentioned purposes. Advantageously, the base is rigid and yields negligible deformation under full pressure load.

The reference window 15 defines the bottom of the cavity 11. Preferably, the reference window lets pass the light, forms a hermetical sealing maintaining the low pressure in the cavity and provides a surface at a reference position $S_0$. The surface of the reference window directed towards the cavity, approximately at its center portion, forms a first reflecting surface $S_1$. The surface of the membrane directed towards the cavity, approximately at its center portion, forms a second reflecting surface $S_2$. The first and second surfaces are opposite to each other across the cavity and define two reflecting surfaces substantially parallel to each other. The distance between the top and the bottom of the cavity is called the cavity length d. More precisely, the first $S_1$ and second $S_2$ reflecting surfaces define said cavity length. The cavity length varies linearly with applied pressure P as it will be explained in more details hereinafter.

The reference window 15 may also serve as a temperature sensor as explained in more details hereinafter. The reference window is made of transparent material, preferably the same material as the other parts.

Advantageously, the membrane supporting wall, the membrane and the base are made of high strength and low plasticity material. The resilience of the material is important for the performance of the pressure measuring device. Moreover, the material should be suited for welding, brazing or glass bonding. Though these requirements do not exclude metal alloys, ceramic materials, such as sapphire, quartz and zirconium show superior physical properties. Advantageously, these material show low hysteresis and low drift and enables, when bonded, to maintain a vacuum cavity even at high temperature. It is to be noted that among the hereinbefore mentioned material, sapphire show outstanding physical properties. The reference window 15 may also be made of sapphire.

The first $S_1$ and second $S_2$ surfaces are substantially parallel and have good reflectivity property. Advantageously, the membrane supporting wall, the membrane and the reference window are ground and polished, separately, to design specifications. Metal films (not shown) may be coated to surfaces where necessary prior to assembling the pressure sensing element 10. The membrane supporting wall, the membrane, the base and the reference window are held together by glass bonding, which can withstand temperature up to 500° C. The bonding agent may be sapphire. Therefore, once assembled, the sensing element is virtually a monolithic piece of sapphire. This uniformity enables better performance of the pressure measuring device. As alternatives, other high-strength adhesives can be used as substitutes to sapphire. Advantageously, the mating surfaces are rough in order to enhance adhesion.

Due to the cylindrical symmetry of the geometry, the pressure sensing element should be cut along the main axis of the crystal material to achieve isotropic stress in the joint plane. In the case of sapphire, which is a bifringent crystal, it is possible to mitigate the effect of ghost images by cutting the reference window along the known optical c-axis.

The principle of absolute pressure measurement and differential pressure measurement will be explained hereinafter.

The flexible membrane may cave in under the effect of a pressure applied onto the membrane by a fluid present outside the pressure sensing element. The deformation of the flexible membrane under the pressure effect changes the distance between the top and the bottom of the cavity. The cavity length d has a linear relation with the applied pressure P within elastic limit, governed by Hooke's law, namely:

$$d(T, P) = d_0(T) - kP \qquad \text{(Eq. 1)}$$

where:
  k is the elasticity constant which depends on the material, geometry and thickness of the membrane, whereas it depends not much on temperature T, and
  $d_0(T)$ is an initial cavity length in vacuum and is considered to be a function of temperature T.

By equilibrating the cavity pressure to a reference pressure, we obtain a true differential gauge. In fact, equation Eq. 1 should be written more precisely as follows:

$$d(T, P) = d_0(T) - k \cdot (P_1 - P_2) \qquad \text{(Eq. 2)}$$

where $P_1$ and $P_2$ represents the pressures above and below the membrane, respectively.

When the pressure below the membrane (in the cavity) is equal to zero ($P_2 = 0$), equation Eq. 2 degenerates to equation Eq. 1 (absolute pressure measurement of the first embodiment). According to equation Eq. 2, the physical quantity to be measured, namely the cavity length d, depends directly on ΔP. As a consequence, the pressure measuring device of the invention is a true differential gauge (second embodiment) as opposed to those featured by subtraction of two independent measurements of absolute pressure.

As an example of dimensions, the outer diameter of the membrane supporting wall may range from 6 to 10 mm, and the inner diameter from 4 to 6 mm. The thickness of the membrane depends on the pressure range of the pressure measuring device. The pressure sensitivity is determined by such factors of the membrane as the diameter, the thickness and the stiffness of the material. The initial cavity length do is preferably short but gives enough room for membrane deformation. From measurement viewpoint, a larger cavity length variation Δd offers better resolution. However, Hooke's law holds only for small strain. Therefore, the cavity length variation Δd should not exceed 10% of the diameter. The cavity length variation may be superior but this may set in plastic deformation, resulting in hysteresis phenomena.

The pressure readout element 20 optically interrogates the cavity length d based on the principle of Fabry-Perot interferometry.

The pressure readout element 20 comprises a fiber optic collimator 21 positioned below the sapphire cavity and at least two reflective surfaces. The fiber optic collimator 21 is coupled by an extremity to an optical fiber 22. The optical fiber 22 is coupled by another extremity to a light source 24 and an optical spectral analyzer 25 through an optical coupler 26. The optical spectral analyzer 25 is coupled to processing means 27 (e.g. a computer). The light source 24, the optical spectral analyzer 25, the optical coupler 26 and the processing means 27 may be positioned downhole or in the surface unit (FIG. 1).

The collimator is accommodated in a hole 16 in the center of the base 14. The collimator could be either of single mode or of multimode.

The size of the collimator should match the size of the hole in use. According to the example given hereinbefore, the hole may have a diameter of 1.80 mm with 0.05 to 0.10 mm tolerance between the hole and collimator size. This allows a slight adjustment of the collimator orientation in beam alignment. The diameter of the light beam delivered by the collimator is approximately 0.4 mm. A small beam size enables easier and more stable alignment.

The collimator is assembled to the base by either adhesives or brazing techniques. During the assembling step, an active alignment is necessary. Alignment is performed by monitoring the return signal while assembling the collimator into the base. More precisely, the orientation of the collimator is adjusted with respect to the membrane within the tolerance limit such as to find a position where the return signal is the maximum. Then, this particular position is held while brazing operation or setting the adhesive took place.

The light source 24 is a broadband light source. For example, the light source covers the range from 1250 nm to 1350 nm. A broader range may be covered by the light source in order to increase the measurement accuracy. The optical spectral analyzer 25 is adapted to the range of the light source. The optical coupler 26 may be a 50/50 optical coupler. A first and a second input of the optical coupler are coupled to the source and the optical spectral analyzer, respectively. The output of the optical coupler is coupled to the collimator via the optical fiber.

A beam of light having a particular wavelength range is fed through the fiber, shaped by the collimator and proceeds towards the membrane across the cavity. There are three boundary surfaces in the beam path, namely surface $S_0$ between the collimator and the reference window, surface $S_1$ between the reference window and the cavity, and surface $S_2$ between the cavity and the membrane. All the surfaces $S_0$, $S_1$ and $S_2$ are smooth optical surfaces. In the case of untreated sapphire, the surface of neat sapphire yields a 7.64% reflectivity. This level of reflectivity is sufficient for a low-finesse Fabry-Perot interferometer. Alternatively, the reflectivity of these surfaces can be tailored individually by applying thin metal films or antireflective coatings such as to improve the performance (for high-finesse) of the Fabry-Perot interferometer. Advantageously, the first surface $S_1$ may be left untreated or may be metal-coated up to 50% reflectivity.

Advantageously, the second surface $S_2$ is treated such as to be a full reflective mirror surface. For example, a thin metal film is evaporated on the inner surface of the membrane. As an example, thin metal film made of gold and/or chromium has good reflectivity and temperature stability. Thus, the second surface $S_2$ enables increasing the signal intensity and eliminating the reflection from outer surface of the membrane. The size of the metal film on the membrane should be sufficient to cover the beam size, e.g. 1 mm diameter. It is to be noted that an excessive size of the metal film deteriorates the elasticity of the membrane, resulting in hysteresis phenomenon. Advantageously, the surface $S_0$ receives an antireflection coating. As an alternative, when the surface $S_0$ is used jointly with the first surface $S_1$ as a temperature sensor as explained in more details hereinafter; the surface $S_0$ is left untreated.

The cavity length measurement principle based on the Fabry-Perot interferometry can be summarized as follow. Each time the beam passes across a surface, from either direction, it splits into two parts. A portion of the beam which is determined by the reflectivity of the encountered surface is reflected back while the remaining portion proceeds forwards. Some beams eventually return to the collimator after subjecting multiple reflections. Beams of different orders possess different amplitude and phase because they have traveled through different paths. When they meet at the collimator, interference takes place resulting in enhancement or cancellation of power depending on the wavelength. Typically, the optical spectral analyzer records the power of return signal as a function of the wavelength, i.e. the power spectrum of the return signal when pressure is stabilized. The processing means comprises appropriate software for interpreting the power spectrum, and determining the distances between the surfaces. The pressure is then correlated primarily from the cavity length d, upon calibrations. Calibrations can be made in laboratory after the manufacturing of the device.

Figure 3:
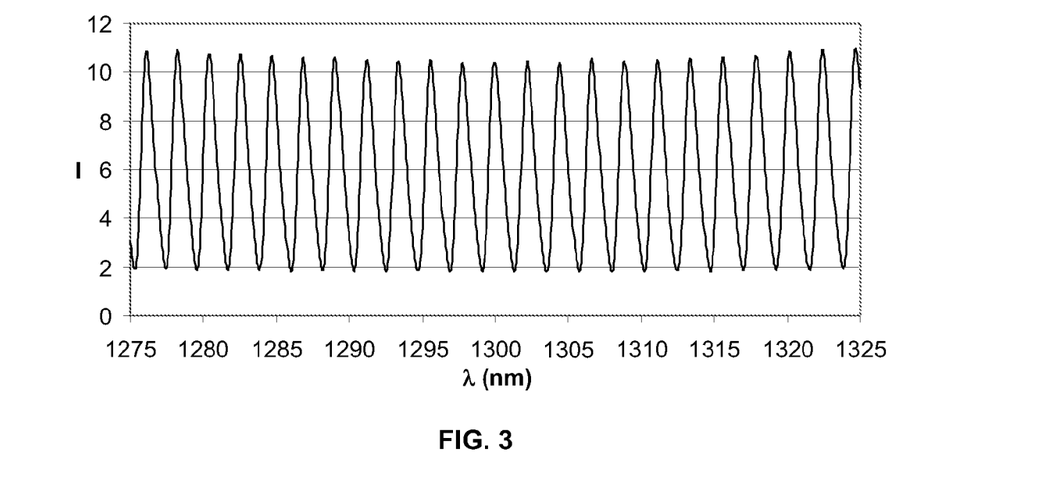
FIG. 3 is a graph showing an interference spectrum of a Fabry-Perot interferometer embedded in the device for measuring pressure according to FIG. 2.

As an example, FIG. 3 illustrates the interference spectrum (intensity/versus wavelength $\lambda$) of a Fabry-Perot interferometer with a cavity length d of 0.382 mm in the wavelength $\lambda$ range from 1275 nm to 1325 nm. The number of fringes or peaks is proportional to the cavity length. Peaks occur when the wavelength satisfies $2d=N\lambda$, with N an integer. Typically, as the resolution of measurement improves with the wavelength span of interrogation, the source should be a broader band light source.

The temperature correction will be described hereinafter. In equation Eq. 1, the cavity length d is also affected by temperature. Typically, the cavity length expands when temperature increases. For example, Sapphire has a thermal expansion coefficient of 5.8 10-6/K. Thus, an initial cavity length $d_0$ of 0.5 mm will gain 0.6 µm, equivalent to 0.12% of the working range, when the pressure measuring device is heated up by 200° C. This leads to an unacceptable margin of error if uncorrected. Thus, temperature compensation is necessary in order to improve the measurement error. According to a first alternative illustrated in FIG. 2, the temperature can be measured by a fiber Bragg grating sensor 23. The fiber Bragg grating can be inserted into the optic fiber 22 near the collimator 21 by fusion-splice. Alternatively, optic fiber with an in-line fiber Bragg grating is also available in the market. The fiber Bragg grating reflects incident light at a specific wavelength of extremely narrow width. Measurement of the wavelength shifts gives a measurement of the temperature with a high accuracy. A drawback of the first alternative is that the temperature is measured at a few centimeters from the cavity. However, said temperature may only differ slightly from that of the cavity. The surface $S_0$ between the reference window and the collimator should be treated by applying an anti-reflection film. The anti-reflection film can be deposited on the window before assembling. In this case, the anti-reflection film must withstand the temperature during the adhesion/bonding process, e.g. approximately 900° C. Alternatively, the anti-reflection film can be deposited on a thin separate substrate (e.g. glass or sapphire). The substrate is subsequently adhered below the reference window face directed towards the collimator with an index-matching glue after the bonding process.

According to a second alternative also illustrated in FIG. 2, the temperature can be measured by using the reference window as an integrated thermometer. The reference window 15 defines between the surfaces $S_0$ and $S_1$ another cavity which length L depends only on the temperature. Therefore the signal of interference contains information on both the cavity length d and the reference window length L. With a proper signal processing algorithm, both lengths can be determined accurately based on the interference fringes (see FIG. 3). The reflectivity of surface $S_0$ should not exceed that of surface $S_1$. When the reference window is made of sapphire, the surface $S_0$ between the reference window and the collimator should not be treated because the natural reflectivity of neat sapphire (7.64%) is just about right. As an example, the reference window length L may be 1.7 mm. A longer reference window length L offers better temperature sensitivity, and also a signal that is better distinguished from the main signal due to the cavity length d. Therefore, the surface $S_0$ does not have to line with the mating plane of the reference window 15 on the base 14. The surface $S_0$ can be either higher or lower to said plane in order to suit different reference window lengths. An advantage of the second alternative is that the temperature is measured in the cavity itself.

According to a third alternative (not shown), the temperature can be measured by a notch filter. A notch filter has a spectral characteristic such as to let pass all wavelengths in the measurement range except in a sharp narrow bandwidth in which the wavelengths are reflected. As the wavelength position of the notch filter shifts with temperature, a temperature correction is possible. The notch filter may be manufactured on a thin substrate which is adhered to surface $S_0$ according to a manufacturing process as described previously in relation with the second alternative. An advantage of the third alternative is that the data interpretation is simplified because the signal corresponding to the temperature measurements occupies a small range of the whole spectrum that is well separated from the signal corresponding to the pressure measurements.

Figure 4:
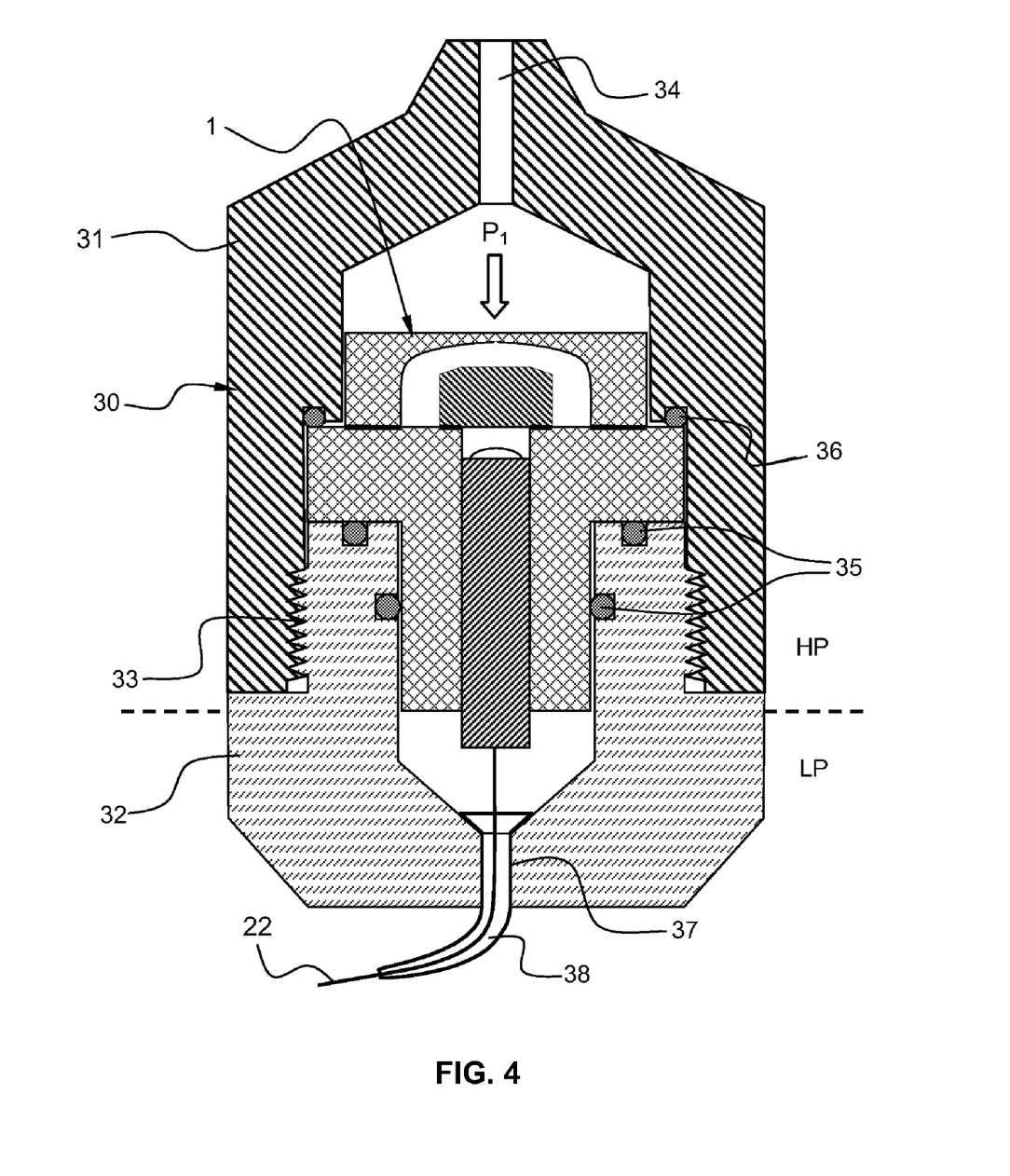
FIG. 4 is a cross-section view schematically illustrating the device for measuring pressure of the invention according to the first embodiment associated with a corresponding packaging structure.

FIG. 4 is a cross-section view schematically illustrating the pressure measuring device 1 of the invention according to the first embodiment associated with a corresponding packaging structure 30.

The packaging structure 30 comprises a packaging cap 31 and a packaging base 32. Advantageously, both elements are made of metal, for example corrosion-resistive alloys. Both elements are thread-joined and enclose the pressure measuring device 1 inside. Obviously, other coupling means may be implemented to securely join the packaging cap and base. The packaging cap approximately corresponds to a side of the device submitted to high pressure HP, while the packaging base approximately corresponds to a side of the device submitted to low pressure LP. Pressure isolation is accomplished by two O-ring seals 35 positioned in the base 32. An additional O-ring 36 positioned in the cap is primarily intended for cushion purpose, while also helping the pressure seal. The O-ring mating surfaces may be polished to assist seal. The cap has an orifice 34 for equalizing the pressure with the fluid pressure $P_1$ to be measured. For example, the orifice 34 may have a diameter around 2 mm. The bottom base 32 further comprises a hole 37 for letting pass the optical fiber 22. Advantageously, the optical fiber is protected by a strain-relieving boot 38. The strain-relieving boot may be a high-temperature rubber or a spring. As an alternative, conventional bellow system is always applicable if one is so desired.

The packaging structure enables keeping the active part of the pressure sensing element free from packaging stresses by means of the elastic O-rings. Thus, the pressure sensing element is highly insensitive to the external mechanical constraints, allowing a use in high shock and vibration environment.

Thus, the pressure measuring device of the invention is simple compared to the prior art devices. Sapphire is extremely resistant to corrosion and erosion. Furthermore, the pressure measuring device of the invention has no added components on the external of the cavity, and therefore does not require any protection that otherwise would be necessary for electrical components.

Figure 5:
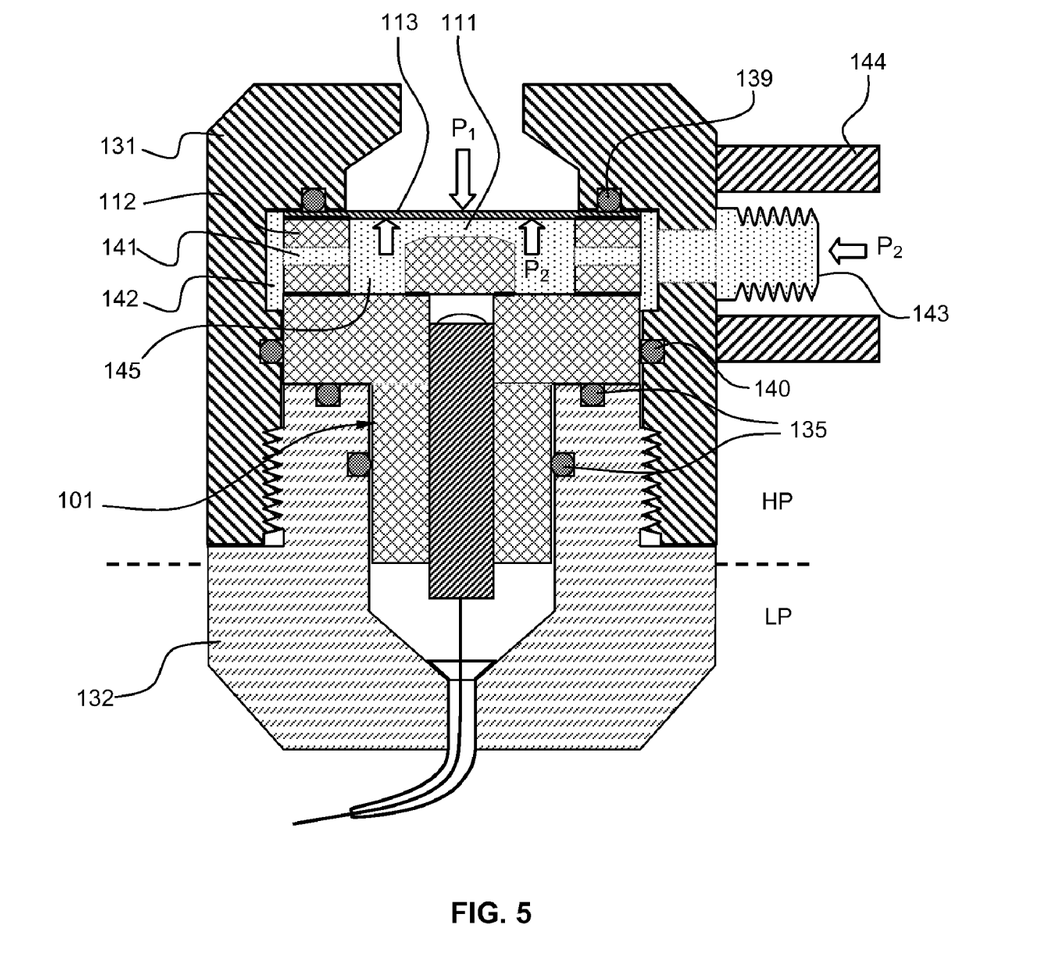
FIG. 5 is cross-section view showing the device for measuring pressure of the invention according to a second embodiment and the corresponding packaging structure.

FIG. 5 is a cross-section view showing the device for measuring pressure of the invention according to a second embodiment and the corresponding packaging structure. The second embodiment is substantially based on the first embodiment and converted so as to be a device for measuring differential pressure. The differential pressure measuring device measures pressure difference between a first $P_1$ and second $P_2$ pressures, namely: $\Delta P=P_1-P_2$. The differential pressure measuring device is obtained by replacing the vacuum in the cavity with the second pressure $P_2$. The pressure difference on both sides of the membrane $\Delta P=P_1-P_2$ determines how the membrane bends. When the second pressure $P_2$ is zero, the device measures absolute pressure (first embodiment). When the second pressure $P_2$ is different from zero, the device measures true differential pressure.

Only the elements of the second embodiment that differ from the first embodiment will be hereinafter described.

The cavity 111, the membrane supporting wall 112 and the membrane 113 of the pressure sensing element 101 have been redesigned. A flat membrane 113 is more appropriate than the dome-profile as it may bend to either direction. The flat membrane 113 is submitted to the first pressure $P_1$. The thickness of the membrane is such that a good sensitivity is obtained while being resistant to high pressure. The stiffness of the membrane is tailored in accordance with the pressure range to be measured. As an example, a full-range of cavity length variation $\Delta d$ may be approximately 7% of the membrane diameter and 90% of the initial cavity length $d_0$. The membrane supporting wall 112 and the membrane 113 may be separate components bonded together. The side wall of the membrane supporting wall 112 comprises holes 141. The holes communicate with a circumferential recess 142 of the packaging supporting wall 131. The circumferential recess 142 is positioned around the membrane supporting wall 112. The circumferential recess 142 communicates with bellows 143. The bellows may be protected by a housing 144 mounted on the packaging supporting wall 131. The bellows 143 is submitted to the second pressure $P_2$. The holes 141 should be, on one hand, kept small so as to preserve the integrity of the cavity 111, and, on the other hand, of adequate size so as not to impede fluid communication across the membrane supporting wall 112. The circumferential recess 142, the cavity 111 and the bellows 143 are bathed in a working fluid 145. A first 139 and second 140 O-ring are positioned above and below the circumferential recess 142, respectively. The O-rings 139, 140 and bellows 143 contains the working fluid 145 and avoids leaks from the circumferential recess 142. The bellows 143 protect the working fluid from external fluids and maintain a pressure balance with the second pressure $P_2$.

Similarly to the first embodiment, pressure isolation may be further accomplished by two O-ring seals 135 positioned between the base 132 and the pressure sensing element 101.

Advantageously, the working fluid 145 is transparent in the wavelength range of measurement and chemically inert, and has a low thermal expansion, a low compressibility and a stable refractive index over temperature. For example, the working fluid 145 may be silicon oil.

As the working fluid has a refractive index greater than unity, the reflectivity at surface $S_1$ is reduced. Thus, a metal film (not shown) may be deposited on surface $S_1$ in order to modify the reflectivity of surface $S_1$ in a range around 20%.

The top side of the membrane is exposed to the first fluid pressure $P_1$. The bellows is exposed to the second fluid pressure $P_2$. Due to the action of the bellows and the holes, the second pressure $P_2$ is presented beneath the membrane by the working fluid. Thus, the deformation of the membrane is only determined by the pressure difference $\Delta P = P_2 - P_1$ across the membrane.

Measurement of the cavity length and determination of the differential pressure are identical to the first embodiment and therefore will not be further described.

The differential pressure measuring device of the invention enables measuring even small differential pressure with a good accuracy.

Figure 6:
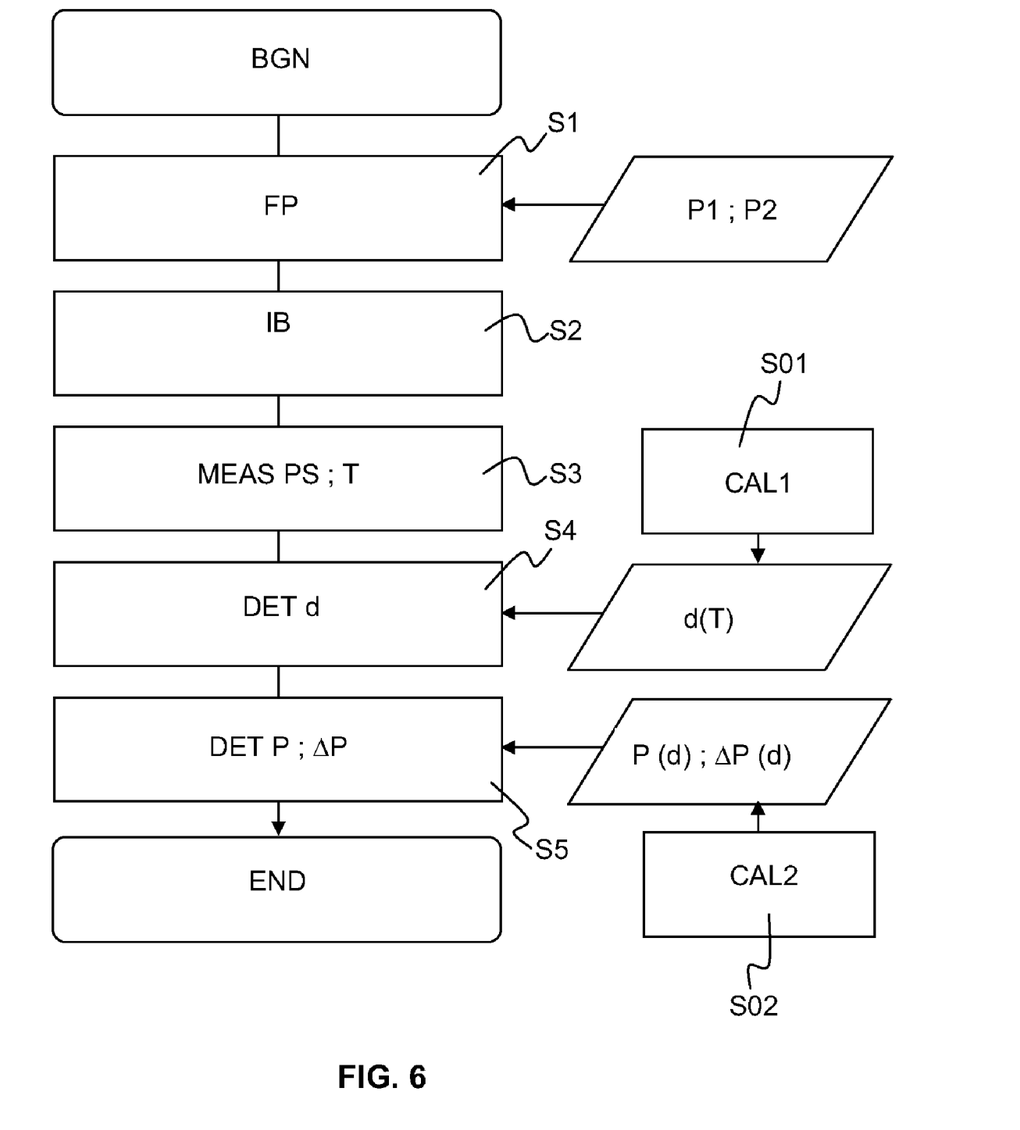
FIG. 6 is a diagram illustrating the sequence of steps of the method for measuring pressure according to the invention.

FIG. 6 is a diagram illustrating the sequence of steps of the method for measuring pressure according to the invention.

In a first step S1, the Fabry-Perot interferometer (FP) is submitted to the first fluid pressure $P_1$. When the device is used as a differential pressure gauge, the cavity filled with a working fluid may be submitted to a second fluid pressure $P_2$.

In a second step S2, an incident beam (IB) of a determined wavelength range is transmitted towards the cavity, In a third step S3, the power spectrum (PS) of the return beam reflected by the cavity is measured. The temperature (T) of the cavity may also be measured.

In a fourth step S4, a measurement of the cavity length d is determined based on the power spectrum. A correction of the measurements of cavity length d based on the temperature T may take place.

In a fifth step S5, a measurement of the fluid pressure $P_1$ is determined based on measurement of the cavity length d. When the device is used as a differential pressure gauge, a measurement of the differential fluid pressure $\Delta P$ is determined based on measurement of the cavity length d.

During an initial step S01, the correspondence between the cavity length d and the temperature T may be determined by calibration (CAL1).

During another initial step S02, the correspondence between the cavity length d and the fluid pressure $P_1$ or differential fluid pressure $\Delta P$ may be determined by calibration (CAL2).

Final Remarks

Though the invention has been described in relation with a particular application of the pressure measuring device to an onshore hydrocarbon well location, the invention may also apply to offshore hydrocarbon well location. Further, the invention is not limited to oilfield application as those versed in the art will recognize that the invention may apply in other application where pressure of fluid needs to be measured in harsh environment, e.g. sewage application, chemical industry, etc. . . .

The drawings and their description hereinbefore illustrate rather than limit the invention.

Any reference sign in a claim should not be construed as limiting the claim. The word "comprising" does not exclude the presence of other elements than those listed in a claim. The word "a" or "an" preceding an element does not exclude the presence of a plurality of such element.

The invention claimed is:

1. A device to measure a fluid pressure comprises a pressure sensing element and a pressure readout element, wherein:
    the pressure sensing element comprises a cavity capped by a flexible membrane, the cavity having a length (d) that varies with the fluid pressure ($P_1$) applied on the flexible membrane, and
    the pressure readout element comprises a light source for providing an incident beam of a determined wavelength range directed towards the cavity and an optical spectral analyzer for measuring a power spectrum of a return beam reflected by the cavity, and processing means for determining the cavity length (d) and the fluid pressure ($P_1$) based on the power spectrum, wherein the pressure readout element further comprises a fiber optic collimator accommodated in the hole behind the reference window, the fiber optic collimator being coupled to the light source and the optical spectral analyzer through an optical fibre and an optical coupler, the optical spectral analyzer being coupled to the processing means.

2. A pressure measuring device according to claim 1, wherein the cavity forms a Fabry-Perot interferometer.

3. A pressure measuring device according to claim 1, wherein the pressure sensing element further comprises a membrane supporting wall and a reference window, the membrane supporting wall supporting the flexible membrane and being supported by a base.

4. A pressure measuring device according to claim 1, wherein the inner part of the flexible membrane and the membrane supporting wall has a dome shape.

5. A pressure measuring device according to claim 1, wherein the base comprises a hole closed by the reference window which defines the bottom of the cavity.

6. A pressure measuring device according to claim 1, wherein a first surface ($S_1$) between the reference window and the cavity, a second surface ($S_2$) between the cavity and the membrane, and a reference surface ($S_0$) between the collimator and the reference window are ground and polished, the first ($S_1$) and second ($S_2$) surfaces being reflecting surfaces.

7. A pressure measuring device according to claim 6, wherein the first surface ($S_1$) is metal-coated up to 50% reflectivity.

8. A pressure measuring device according to claim 6, wherein the second surface ($S_2$) is metal-coated such as to be a full reflective mirror surface.

9. A pressure measuring device according to claim 6, wherein the reference surface ($S_0$) is left untreated or receives an antireflection coating.

10. A pressure measuring device according to claim 1, wherein a fiber Bragg grating inserted into the optic fiber near the collimator is used as a temperature sensor.

11. A pressure measuring device according to claim 6, wherein the reference window defining the reference surface ($S_0$) and the first surface ($S_1$) is used as a temperature sensor, the reference surface ($S_0$) being left untreated.

12. A pressure measuring device according to claim 6, wherein a notch filter adhered to the reference surface ($S_0$) of the reference window is used as a temperature sensor.

13. A pressure measuring device according to claim 1, wherein at least the membrane supporting wall and the flexible membrane of the pressure sensing element are made of a material chosen among the group of material comprising sapphire, quartz and zirconium.

14. A pressure measuring device according to claims 1, wherein the membrane supporting wall, the flexible membrane, the base and the reference window are made of sapphire and bonded together by a sapphire bonding such as to form, once assembled, a monolithic piece of sapphire.

15. A pressure measuring device according to claim 1, wherein the cavity is a vacuum cavity.

16. A device to measure a fluid pressure comprises a pressure sensing element and a pressure readout element, wherein:
the pressure sensing element comprises a cavity capped by a flexible membrane, the cavity having a length (d) that varies with the fluid pressure ($P_1$) applied on the flexible membrane, and
the pressure readout element comprises a light source for providing an incident beam of a determined wavelength range directed towards the cavity and an optical spectral analyzer for measuring a power spectrum of a return beam reflected by the cavity, and processing means for determining the cavity length (d) and the fluid pressure ($P_1$) based on the power spectrum, wherein:
the membrane is a flat membrane,
the membrane supporting wall comprises holes communicating with a circumferential recess,
the circumferential recess being positioned around the membrane supporting wall and communicating with bellows,
the circumferential recess, the cavity and the bellows being bathed in a working fluid,
a first and second O-ring being positioned above and below the circumferential recess, respectively,
the top side of the membrane being exposed to a first fluid pressure ($P_1$), the bellows being exposed to the second fluid pressure ($P_2$), the cavity length (d) varying with the first fluid pressure ($P_1$) applied on the flat membrane and the second fluid pressure ($P_2$) applied on the bellows such as to form a differential pressure measuring device.

17. A device to measure a fluid pressure comprises a pressure sensing element and a pressure readout element, wherein:
the pressure sensing element comprises a cavity capped by a flexible membrane, the cavity having a length (d) that varies with the fluid pressure ($P_1$) applied on the flexible membrane, and
the pressure readout element comprises a light source for providing an incident beam of a determined wavelength range directed towards the cavity and an optical spectral analyzer for measuring a power spectrum of a return beam reflected by the cavity, and processing means for determining the cavity length (d) and the fluid pressure ($P_1$) based on the power spectrum, wherein the pressure sensing element is contained in a packaging structure comprising:
a packaging cap coupled to a packaging base, the packaging cap being subjectable to a high pressure (HP), the packaging base being subjectable to a low pressure (LP),
a plurality of O-ring for pressure isolation between the packaging base and the packaging cap,
the packaging cap further having an orifice for equalizing the pressure with the fluid pressure to be measured,
the bottom of the base comprising a hole for letting pass the optical fiber.

18. A pressure measuring device according to claims 16, wherein the circumferential recess are formed in the packaging cap and the bellows are protected by a housing mounted on the packaging cap.

19. A pressure measuring device according to claim 17, wherein the optical fiber is protected by a strain-relieving boot.

* * * * *